United States Patent [19]

Lu

[11] Patent Number: 5,317,469

[45] Date of Patent: May 31, 1994

[54] ARRANGEMENT OF AN OVER-VOLTAGE PROTECTION CIRCUIT

[76] Inventor: Chao-Cheng Lu, 4-4, Alley 27, Lane 143, Chun Kung Rd., Taipei 11614, Taiwan

[21] Appl. No.: 853,941

[22] Filed: Mar. 19, 1992

[51] Int. Cl.⁵ .................. H02H 3/20; H02H 3/22; H02H 7/04; H02H 9/04

[52] U.S. Cl. ............................. 361/40; 361/38; 361/91; 361/111

[58] Field of Search .............. 361/35, 38, 40, 56, 361/91, 111, 112, 117, 120

[56] References Cited

U.S. PATENT DOCUMENTS

| | | | |
|---|---|---|---|
| 3,206,644 | 9/1965 | Spindle | 317/46 |
| 3,991,367 | 11/1976 | Chapman et al. | 324/133 |
| 4,629,901 | 12/1986 | Nishizawa | 250/551 |
| 4,939,618 | 7/1990 | Fingerson et al. | 361/117 |

Primary Examiner—A. D. Pellinen
Assistant Examiner—Ronald W. Leja
Attorney, Agent, or Firm—Jacobson, Price, Holman & Stern

[57] ABSTRACT

A circuit arrangement having the function of preventing over-voltage damage which is structured by special copper foil or conductive wires and applies the burst absorption principle to form a short circuit from the input end and the output end of a circuit when the circuit is subject to an over-voltage or a transient electrical strike, so as to protect the electronic elements within the area of the circuit. The method can be put into application in a transformer, a switching power supply, an electronic computer, a solid-state relay and other similar electronic equipment. The arrangement of the present invention has undergone a number of high voltage and electrical striking tests with more than satisfactory results and is suitable for use in industries.

9 Claims, 3 Drawing Sheets

ARRANGEMENT OF AN OVER-VOLTAGE PROTECTION CIRCUIT

BACKGROUND OF THE INVENTION

The present invention relates to an arrangement of the components in a circuit, in order to prevent the electronic components in the circuit from being damaged by an over-voltage. The arrangement is especially suitable for high electric power devices requiring a high voltage processing operation or usually having to be installed outdoors so as to protect the component elements thereof.

Previously, the practice of preventing over-voltage damage was usually conducted using a photo coupler (such as photo-transistor coupler and photo-thyristor coupler etc.) as a coupling element between an input terminal and an output terminal of an electronic circuit for the purpose of isolating the input terminal and the output terminal. Generally, the breakdown voltage of the optimal photo coupler recognized in the art is approximately up to 5,000 VAC. Therefore, devices having such couplers are free of any problems as long as the over-voltage thereof does not exceed 5,000 VAC. However, once a high voltage over 5,000 VAC appears across the input and the output terminals of the circuit, the high voltage will go from the input (or output) side to the output (or input) side through the photo-thyristor and the electronic elements of the circuit. In such case, the photo-thyristor and the electronic elements will be damaged, and the entire printed circuit board may even be burned out. It is clear that over-voltage protection between the input terminal and the output terminal of a circuit is of vital importance. In view of the fact that the maximum breakdown voltage of existing photo-couplers is no more than 5,000 VAC, the present invention develops a specific circuit arrangement based on a series of experiments.

SUMMARY OF THE PRESENT INVENTION

One object of the present invention is to provide a circuit arrangement which is capable of protecting the electronic elements between the input side and the output side of a circuit from being damaged by electric-strike or over-voltage, as well as having the effect of keeping the input side isolated from the output side of the circuit. The object is achieved by a specific arrangement of copper foils or conductive wires which themselves may be ones of composed elements of the circuit or additional elements on the inner side of both input terminal and output terminal, so that when an over-voltage occurs, the over-voltage will first go through the conductive wires to a ground or a low voltage side. In this way, the electronic elements in the circuit will be protected from damage from the over-voltage.

Another object of the present invention is to provide a photo-electric box for covering a circuit to increase the rated breakdown voltage of the circuit. The photo-electric box is made of insulating plastic material and uses a light emitted diode (LED) at an input end thereof and a photo diode, a photo-transistor, a photo-thyristor, or a light emitted varistor (Cadmium Sulfide, CDS) at an output end thereof. The value of the voltage which the photo-electric box can endure varies with the change of distance between the input end and the output end of the photo-electric box. In addition, a plastic plate having a high transmittancy can be placed between the input end and the output end of the photo-electric box which can also be taken off if the required rated breakdown voltage is not so high.

One further object of the present invention is to provide an over-voltage protection circuit which is simple in construction and can achieve maximum effectiveness with minimum cost.

Further objects and advantages of the present invention can be well understood by the following description of the preferred embodiment and the accompanying drawings:

DESCRIPTION OF THE PREFERRED EMBODIMENTS

Figure 1:
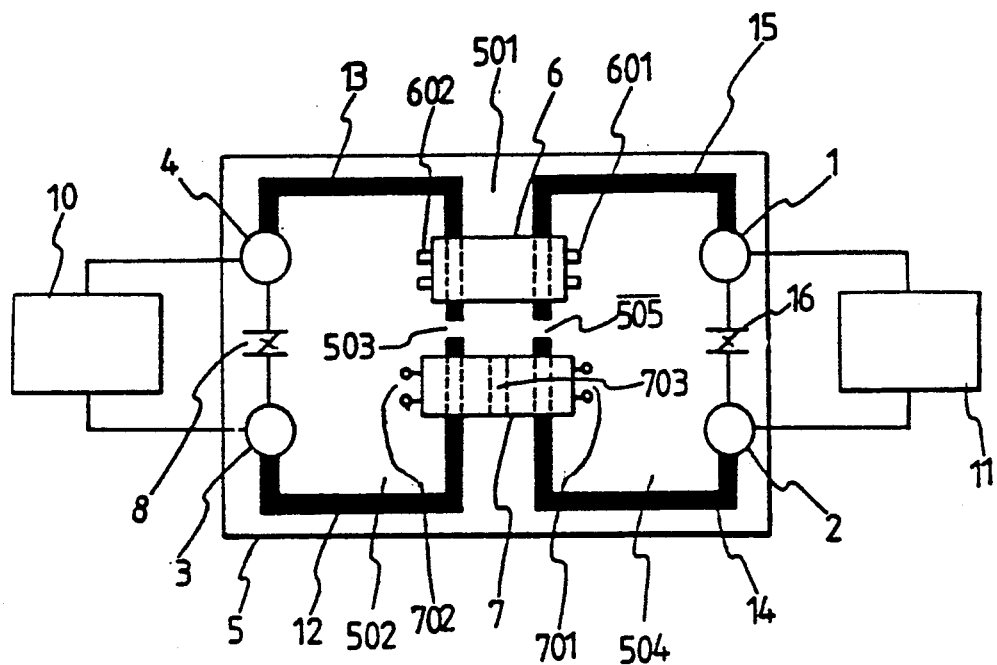
FIG. 1 shows a first embodiment of the present invention in the application as an over-voltage protection device in a printed circuit board.

FIG. 1 illustrates an embodiment of the present invention wherein a printed circuit board with the arrangement of the present invention is disclosed. The printed circuit board includes an input side 11, an output side 10 and a number of electronic elements (not shown in the Figure) and an additional photo-coupler 6 for preventing the board from damage from over-voltage. According to the present invention, four copper foils 15, 14 and 13, 12 are used which extend respectively to the photo-coupler 6 from an upper input end 1 and an lower input end 2 on the input side 11 and an upper output end 4 and an lower output end 3 on the output side 10. In addition, two burst absorbers 16 and 8 are connected respectively between the upper input end 1 and the lower input end 2, and the upper output end 4 and the lower output end 3 for absorbing unnecessary burst waves on the input and output sides when an over-voltage occurs. It should be noted that the copper foils 15 and 14 respectively extending from the upper input end 1 and lower input end 2 form an enclosure 504 and the enclosure has a gap 505 between one end of each of the copper foil 15 and 14 for serving as a first buffer space when the circuit is subject to an over-voltage or an electric strike. Similarly, the copper foils 13 and 12 extending respectively from the upper output end 4 and the lower output end 3 also form an enclosure 502 and the enclosure 502 has a gap 503 between one end of each of the copper foil 13 and 12 for serving as a second buffer space. The enclosures 504 and 502 are divided by a separated space 501, which is used for isolating the input side from the output side. The electronic elements of the printed circuit board are installed in the enclosures 504 and 502.

The photo coupler 6 is a conventional coupler with an input terminal 601 thereof being placed in the enclosure 504 and an output terminal 602 thereof being placed in the enclosure 502. The other portions of the photo coupler except for the input and output terminals 601 and 602 are installed in the separated space 501. As shown in FIG. 1, the distance of the separated space 501 should be suitable to accommodate the portion of the body of the photo coupler 6, excluding the input terminal 601 and the output terminal 602.

Figure 2:
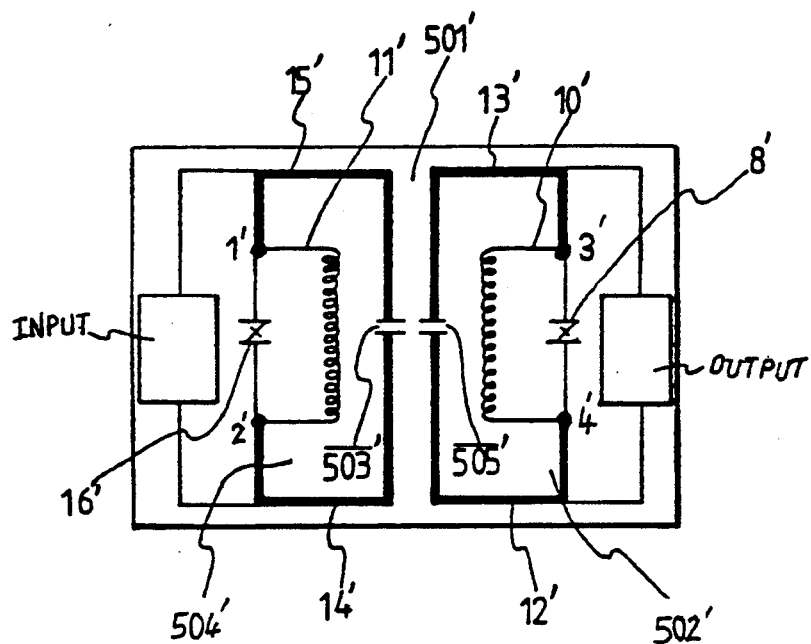
FIG. 2 shows a second embodiment of the present invention in the application as an over-voltage protection device in a transformer.

The arrangement in accordance with the present invention may also be applicable for providing over-voltage protection in transformers, as shown in the second embodiment illustrated in FIG. 2. The transformer shown in FIG. 2 comprises a primary winding 11' and a secondary winding 10' with burst absorbers 16' and 8' connected respectively between upper and lower input ends 1' and 2' of the primary winding and upper and lower output ends 3' and 4' of the secondary winding of the transformer for absorbing abnormal voltage. Two copper foils 15' and 14' extend from an upper and a lower input ends 1' and 2' of the primary winding 11' respectively to a center part of the two windings 11' and 10' to form a first enclosure 504' with a gap 503' provided between the ends of the two foils 15' and 14'. Similarly, two copper foils 13' and 12' extend from an upper and a lower output ends 4' and 3' of the secondary winding 10' of the transformer respectively toward the center part of the two windings to form a second enclosure 502' with a gap 505' provided between ends of the two copper foils 13' and 14'. As mentioned above, the gaps 503' and 505' are used as buffer spaces when an over-voltage or electric-strike occurs. In addition, the enclosures 504' and 502' are separated by a separated space 501' used for isolating the primary winding 11' from the secondary winding 10'. The wider the separated space 501' is, the higher the voltage it can withstand.

As described above, whenever an over-voltage or an electric-striking voltage suddenly enters into the input side of a PC board or a transformer having the arrangement in accordance with the present invention, the voltage will go through the path formed by the copper foils from a high potential end toward a lower potential end or directly to a ground, without going through the area where the electronic elements are installed. Therefore, the electronic elements in the circuit are protected from damage which may be caused by such an over-voltage.

In addition, the distance between the input terminal 601 and the output terminal 602 of any known photo coupler is fixed and the rated breakdown voltage thereof is also fixed so that the rated breakdown voltage cannot be adjusted as required; therefore, in the present invention, the photo coupler 6 also can be replaced by a photo box 7, having a selectively endurable voltage value. Although FIG. 1 shows both the photo box 7 and the photo-coupler 6, it is understood the photo box 7 can replace the photo-coupler 6.

Figure 3:
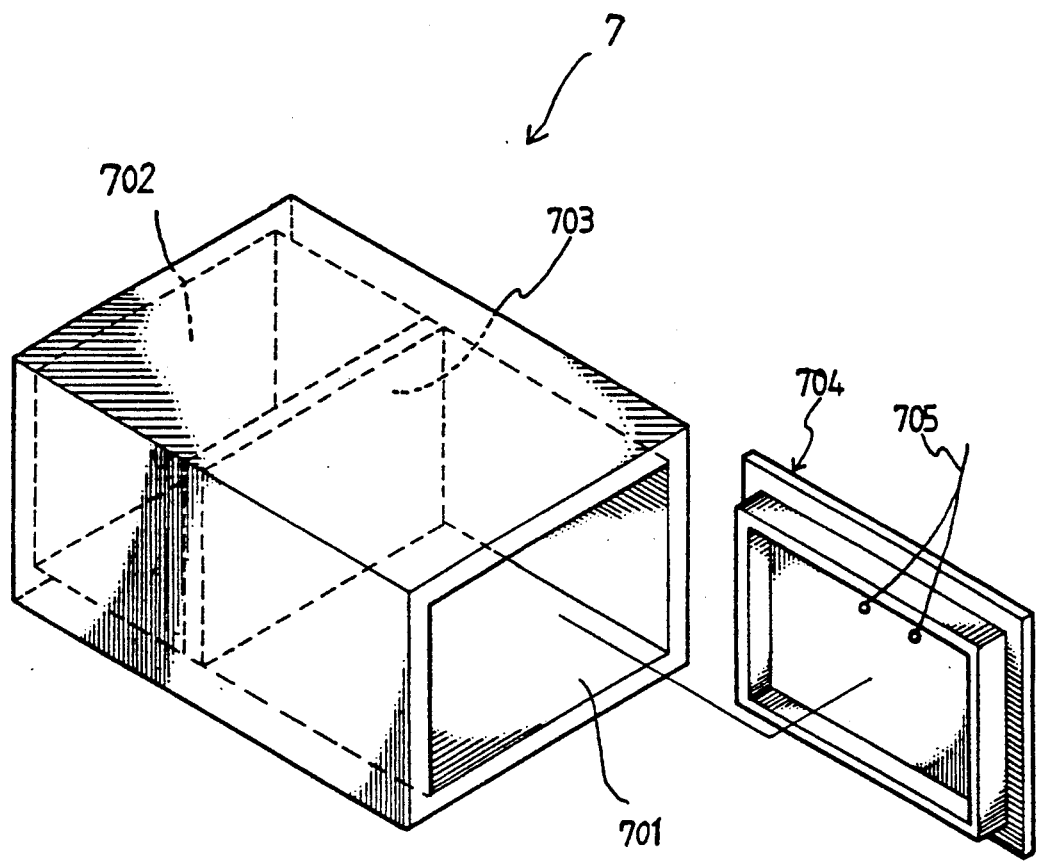
FIG. 3 shows a perspective view of a photo-electric box of the present invention.

The photo box 7, as shown in FIG. 3, is made of non-transparent plastic material with a light emitted diode (LED) on an input side 701 thereof and a photodiode, photo-transistor, photo-thyristor or photo variable resistor on an output side 702 thereof. The distance between the input side 701 and the output side 702 can be adjusted as required; and the longer the distance is, the higher the rated breakdown voltage will be; i.e. the larger the width of the separated space 501 is, the higher the breakdown voltage will be. Using this design, an insulating effect better than that of conventional photo coupler can be developed.

The inside of the photo box 7 is provided with a transparent insulating plate 703 to prevent the input side 701 and the output side 702 from being broken through by an electric striking voltage or an over-voltage. The transparent insulating plate 703 can be omitted, if the distance between the input side 701 and output side 702 is enough to provide the desired endurable breakdown voltage. In addition, a LED socket 704 and a photo variable resistor socket (not shown in the figure, the configuration thereof is the same as that of the LED socket 704), respectively, are provided on the input and output sides of the photo box, and each socket has two holes 705 for inserting pins of the LED or the photo variable resistor.

Further, the width of the copper foils 14, 15, 13 and 12 (or 14', 15', 13' and 12' in FIG. 2) can be changed in proportion to the magnitude of the electric-striking voltage desired to be endured. The copper foils can also be replaced by tin-plated copper foils or conducting wires so as to increase the circuit conductivity of the present invention.

In order to prove that the function of the circuit arrangement disclosed in the present invention is capable of preventing over-voltage damage in an effective manner, an experiment using a high voltage tester is used and described herein below (taking the circuit of FIG. 1 as example).

First, the positive voltage end of the high voltage tester is connected to the lower output end 3 of the circuit and the negative voltage end of the tester is concerned to the lower input end 2. When high voltage is applied to the circuit, the high voltage goes through the copper foil 12 and the burst absorber 8 to the copper foil 13. At this time, the internal area of the enclosure 502 is at the same potential as the high voltage and the potential at the region from the copper foil 14 to the copper foil 15 via the burst absorbers 16 is the same as that at the negative end of the high voltage tester. When the voltage from the high voltage tester is gradually increased, the potential difference between two sides of the separated space 501 will be increased accordingly; and when the voltage from the high voltage tester is increased to a level higher than the breakdown voltage of the separated space 501, the high voltage will break through the separated space 501 and reach the negative voltage end. Finally, the test is cut off when the current passing through the high voltage test reaches a cut-off current. A check is made after this experiment, and it is found that none of the electronic elements in the enclosures 502 and 504 are damaged. This experiment satisfactorily proves that the design disclosed by the present invention does have the function of effectively preventing the electronic elements in a circuit from being damaged by over-voltage.

It can be seen from the above description that the advantage of the present invention is featured by providing over-voltage damage protection functions through the use of a special design in a circuit, itself, without using any special external insulating equipment or devices, and that the isolating or insulating effect as described hereinabove has been duly proven by experimental test.

Although the purpose of this invention can be realized by many of the embodiments described above, those who are well skilled in the art may make any modification or modifications based on the principle of the present invention without departing from the scope of the present invention. The scope of this invention shall be confined in the scope of claims given hereinafter.

I claim:

1. A circuit arrangement for protecting a circuit from over-voltage damage, comprising:
an input side having a burst absorber installed between two terminals thereof and two conductive elements respectively extending from said two terminals toward a central portion of the circuit to form a first at least partial enclosure;

an output side having a burst absorber installed between two terminals thereof and two conductive elements respectively extending from said two terminals of the output side toward the central portion of the circuit to form a second at least partial enclosure;

a space region set between said first at least partial enclosure and said second at least partial enclosure for isolating the input side from the output side; and a photo coupler installed across said space region and connected with said conductive elements on both of said input and output sides.

2. A circuit arrangement according to claim 1, wherein said two conductive elements forming said first at least partial enclosure converge toward one another near the central portion of the circuit board but do not connect to one another to thus define a first gap, and wherein said two conductive elements forming said second at least partial enclosure also converge toward one another but do not connect to one another to thus define a second gap, said first and second gaps serving as buffer regions when an over-voltage is input into the circuit and widths thereof being dependent upon the maximum desired value of an input voltage of said input side; said burst absorber on said input side having a breakdown voltage determined depending on the maximum value of the input voltage, the value of the breakdown voltage being higher than that of the input voltage at the input side.

3. A circuit arrangement according to claim 1, wherein said burst absorber on said output side has a breakdown voltage determined depending on the maximum value of an output voltage, the value of the breakdown voltage being higher than that of the output voltage at said output side.

4. The circuit arrangement according to claim 1, wherein said photo coupler comprises a photo box for providing a higher rated breakdown voltage, said photo box being made of non-transparent plastic material and comprising:

a light emitting diode installed on an input side thereof; and a photo-diode, a photo transistor, a photothyristor or a photo variable resistor on an output side thereof; and the distance between said input side of the photo box and said output side of the photo box being selected to provide a desired breakdown voltage.

5. The circuit arrangement according to claim 4, wherein said photo box further comprises a transparent insulating plate provided inside the photo box for preventing said input side and said output side of the photo box from being broken through by an electric striking voltage or an over-voltage.

6. The circuit arrangement according to claim 1, wherein an input side of the photo coupler is disposed in said first at least partial enclosure for connection to circuit components on the input side of said circuit arrangement; and wherein an output side of said photocoupler is disposed in said second at least partial enclosure for connection to circuit components on the output side of said circuit arrangement, the distance between the input side and output side of the photo coupler being larger than the width of said space region.

7. The circuit arrangement according to claim 1, wherein said conductive elements are copper foils or conductive wires.

8. A circuit arrangement for protecting a transformer from over-voltage damage, said arrangement comprising:

an input side comprising a primary winding, a burst absorber connected between two ends of said primary winding for absorbing abnormal voltage and two conductive elements extending from said two ends of said primary winding to form a first at least partial enclosure; and an output side comprising a secondary winding, a burst absorber connected between two ends of said secondary winding for absorbing abnormal voltage and two conductive elements extending from said two ends of said secondary winding to form a second at least partial enclosure; said first and second at least partial enclosures being separated by a space region;

wherein said two conductive elements extending from said two ends of the primary winding converge toward one another between the primary and secondary windings to thus define a first gap, and wherein said two conductive elements extending from said two ends of the secondary winding also converge toward one another between the primary and secondary windings to thus define a second gap, the rated breakdown voltage that said first and second gaps provide being higher whenever the size of said first and second gaps is increased.

9. The circuit arrangement according to claim 8, wherein said conductive elements are copper foils or conductive wires.

* * * * *